June 3, 1930.    A. JORDAHL    1,760,986
AIR FILTER
Filed May 20, 1924
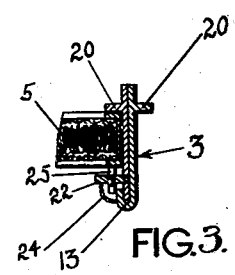
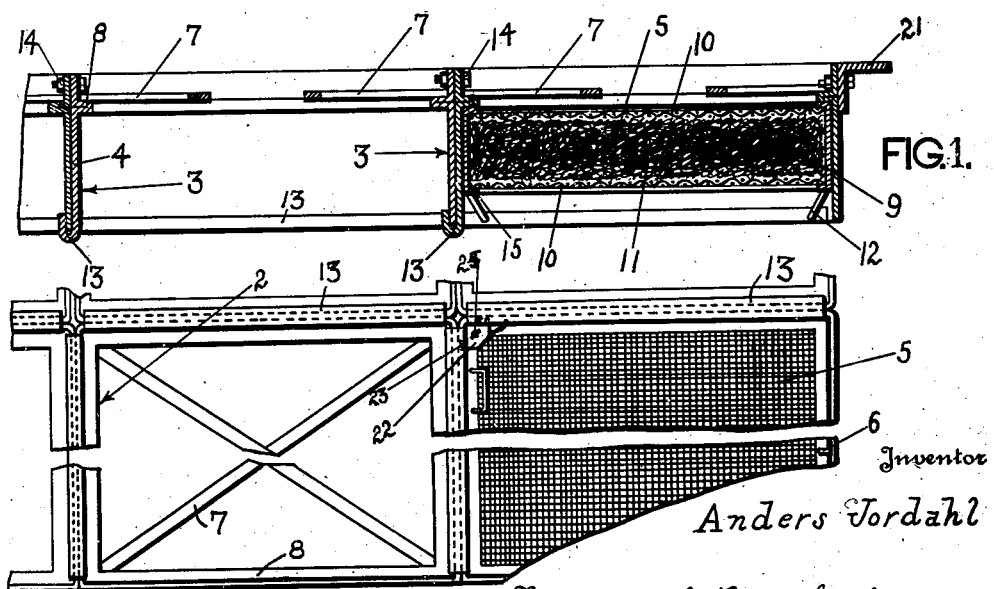

Patented June 3, 1930

1,760,986

UNITED STATES PATENT OFFICE

ANDERS JORDAHL, OF NEW YORK, N. Y.

AIR FILTER

Application filed May 20, 1924. Serial No. 714,676.

This invention relates to an air or gas filter of the type in which a plurality of individual and interchangeable filter units are assembled into a structure of varying sizes and capacities. Such filters consist of a stationary frame into which removable filter units are adapted to be inserted. Heretofore the stationary framework consisted of individual frames made of metal bars of angle or channel cross-section, the several frames being assembled together by means of a plurality of bolts passing through the walls of adjoining frames. The filter units are made of sheet metal of angle or Z-shape in cross-section and are inserted into the stationary frames in such a manner that the flanges of the filter units fit against the front flanges of the stationary frames, being thus removably secured thereto. The body of the filter units will therefore extend into the stationary frame, thus clearing the heads of the bolts connecting the adjoining frames. A number of disadvantages have been found in this arrangement, some of which are the following: The joints between adjoining stationary frames are a source of considerable air leakage. The effective area of the filter units and consequently of the filter medium must be considerably smaller than the total area of the stationary frames in order to enable the filter units to be inserted into the stationary frames to clear the bolt heads. It is also difficult to form tight joints between the face of the frames and the flanges of the filter units and furthermore the method of securing the filter units to the frames is very difficult and requires very exact and expensive workmanship. These are all serious disadvantages tending to decrease the usefulness and efficiency of the filters and it is particularly a great drawback that the effective area of the filters must be much smaller than the area of the stationary framework.
In the present invention all of the foregoing difficulties have been overcome by efficient and simple means and it is an object of this invention that the stationary framework forms pigeon holes into which the filter units are removably inserted without having to reduce the filter area on account of projecting bolt heads. The effect is thus accomplished that the combined effective area of the filter units is almost the same as the total area of the stationary frames and this is produced by making the partitions between the pigeon holes of thin flanged sheet metal whereby the flanges are produced on the rear or inside of the framework to thus act as stops to which the filter units can be pressed so that a substantially air-tight joint is produced. It is a further object of this invention to provide frame structures which can be built up or increased to accommodate as many filter units as desired. A still further object is to provide novel securing means for the filter unit in the framework and such means comprises a plate adapted to be inserted into the framework and by means of a wedge or a pinscrew it can force the filter unit against the framework.

Other objects will be apparent from the following specification taken in connection with the accompanying drawing in which the same reference characters indicate corresponding parts throughout, and in which:

Fig. 1 is a sectional view of several sections of the framework,

Fig. 2 is a plan view of Fig. 1, and

Fig. 3 is a sectional view showing details of the frame.

The stationary framework can either be built up of cast, rolled, drawn or bent shapes, or it can consist of individual frames of sheet metal, each forming a pigeon hole to receive a filter unit. As shown on the drawing, the frame comprises as many sections or pigeon holes 2 as desired and these holes are formed by a flanged metal plate member 3 comprising a thin plate or member 4 having flanges 8 thereon. These flanges form stops for the filter units 5 only one of which is shown secured in place. Any suitable means may be provided for securing the filter units in the pigeon holes. If this framework comprises a great many pigeon holes or if it is built high and narrow as for instance a width of two pigeon holes and a height of six holes, it is preferable to provide bracing means and such means may comprise diagonal braces 7 which may be welded or riveted on the rear of the flanges 4. If desired two diagonal braces may be secured to each pigeon hole or only one, or any combination may be used, depending upon the size and circumstances.

The unit filter 5 can be built in any desired form but it is here shown as comprising a channel frame member 9 having the flanges turned towards the filter medium, which frame member secures two screens 10 by means of the flanges between which the filter medium 11 is placed. Suitable handles 12 may be secured to the frame member 9 by which the filter units may be inserted or removed from the stationary framework.

The form of construction shown discloses a sectional framework which is adapted to be built up in sections whereby additions can be made or the installation can be made smaller. Each section comprises a square flanged metal plate member 3 having a thin plate 4 from which the flanges 8 are pressed therein. The plate 4 has a bent portion 13 at the end opposite the flange 8 forming an interlocking portion by means of which it is adapted to grip the plate of the adjoining section, thus forming interlocking joints. Each section is provided with two straight outside edges and two bent edges whereby any number of sections can be securely joined together to form one unitary structure. In order to insure a more secure connection, these sections may be secured together at the inner end by means of bolts 14 which however do not interfere with the filter unit. The special plate or clip 22 may be provided in opposite corners and this plate comprises projections 23 adapted to fit in slots in the thin plate 4 but these slots are made so that the projections shall have ample clearance so that they can be removed for the purpose of removing the filter. A chain 24 may be secured to the plate and to the framework so that the plate cannot be lost. For the purpose of applying a wedging action to thus force the filter unit against the flange a wedge may be driven between the filter and this plate 22 but preferably a pinscrew 25 may be used, which abuts against and forces the filter against the flange. Fig. 3 shows a section of the securing means in place, but it must be remembered that the filter unit has clearance between it and the frame so that it can easily be removed.

Fig. 3 is similar to the construction shown in Figs. 1 and 2 except that the flange 20 is made in a single integral piece instead of being a double piece, and shows the holding means for the filter unit 5.

It is of course understood that these frames can be built in any desired shape and size and for the purpose of making a square framework, angle bars 21 can be used to which the side of the frames or sections can be bolted.

By means of the flanges 8 the filter units can be forced against these flanges to thus form an air-tight joint and from the drawing it will be seen that the frame member 9 will abut against this flange. If desired the filter unit can be constructed so that a clearance will be maintained between it and the frame.

I claim as my invention:

1. An air and gas filter comprising a stationary framework of individual interlocked frames, each frame composed of members forming the sides of a receptacle, each receptacle being open at both ends for the passage of air; flanges on said sides; and a filter unit adapted to be inserted into and fit conformably in a receptacle and against said flanges, the width and height of the filter unit being respectively equal, except for a slight clearance, to the width and height of the receptacle, and the unit being adapted to be forced against said flanges in order to provide substantially air-tight joints.

2. An air and gas filter comprising a stationary framework of individual interlocked frames, the frames composed of members forming the sides of a plurality of receptacles, each receptacle being open at both ends for the passage of air; flanges on said sides adjacent one end of its respective receptacle; and a filter unit adapted to be removably inserted into and fit conformably in each receptacle and against said flanges, the width and height of the filter unit being respectively equal, except for a slight clearance, to the width and height of the receptacle and the unit being adapted to be forced against said flanges in order to provide substantially air-tight joints.

3. An air and gas filter comprising a stationary framework composed of members forming the sides of receptacles, each receptacle being open at both ends for the passage of air; flanges on said sides; a bent portion forming an interlocking portion on the edges of said members, said bent portions being adapted to interlock with the edges of adjoining members in order to secure the framework together; and a filter unit adapted to be inserted into and fit conformably in a receptacle and against said flanges, the width and height of the filter unit being respectively equal, except for a slight clearance, to the width and height of the receptacle and the unit being adapted to be forced against said flanges in order to provide substantially air-tight joints.

4. An air and gas filter comprising a stationary framework composed of members which form the sides of a plurality of receptacles, each receptacle being open at both ends for the passage of air; flanges on said sides adjacent one end of its respective receptacle; a bent portion forming an interlocking portion on the edges of said members, said bent portions being adapted to interlock with the edges of adjoining members in order to secure the framework together; and a filter unit removably inserted into each receptacle and against said flanges, the width and height of the filter unit being respectively equal, except for a slight clearance, to the width and height of the receptacle.

5. An air and gas filter comprising a stationary framework composed of members forming the sides of receptacles, each receptacle having four sides and being open at both ends for the passage of air; flanges on said sides; a bent portion forming an interlocking portion on the edges of two sides of the frame, said bent portions being adapted to interlock with the other two edges of adjoining members in order to secure the framework together; and a filter unit adapted to be inserted into a receptacle and against said flanges, the width and height of the filter unit being respectively equal, except for a slight clearance, to the width and height of the receptacle and the unit being adapted to be forced against said flanges in order to provide substantially air-tight joints.

6. An air and gas filter comprising a stationary framework composed of members forming the sides of receptacles, each receptacle being open at both ends for the passage of air; flanges on said sides; a bent portion forming an interlocking portion on certain edges of said members, said bent portions being adapted to interlock with the edges of adjoining members in order to secure the framework together; a filter unit adapted to be inserted into a receptacle and against said flanges, the width and height of the filter unit being equal, except for a slight clearance, to the width and height of the receptacle and the unit being adapted to be forced against said flanges in order to provide substantially air-tight joints; and a plurality of bolts to form additional securing means for said framework.

7. An air and gas filter comprising a stationary framework composed of members forming the sides of receptacles, each receptacle having four sides and being open at both ends for the passage of air; flanges on said sides; a bent portion forming an interlocking portion on the edges of two sides of the frame, said bent portions being adapted to interlock with the other two edges of adjoining members in order to secure the framework together; a filter unit adapted to be inserted into a receptacle and against said flanges, the width and height of the filter unit being equal, except for a slight clearance, to the width and height of the receptacle and the unit being adapted to be forced against said flanges in order to provide substantially air-tight joints; and a plurality of bolts to form additional securing means for said framework.

8. A sectional frame for unit air filters comprising four members secured together to form a receptacle for the filter unit; a flange in said members which is adapted to form an abutment for the unit; and interlocking means on the edges of two members which are adapted to grip the other two members of adjoining receptacles, in order to rigidly secure the receptacles together.

9. A sectional frame for unit air filters comprising four members secured together to form a receptacle for the filter unit; a flange in said members which is adapted to form an abutment for the unit; interlocking means on the edges of two members which are adapted to grip the other two members of adjoining receptacles in order to rigidly secure the receptacles together; and additional securing means for said members.

10. An air and gas filter comprising a stationary frame work composed of members forming the sides of receptacles, each receptacle being open at both ends for the passage of air; flanges on said sides; a bent portion forming an interlocking portion on the edges of certain members, said bent portions being adapted to interlock with the edges of adjoining members in order to secure the framework together; a filter unit adapted to be inserted into a receptacle and against said flanges, the width and height of the filter unit being equal, except for a slight clearance, to the width and height of the receptacle; a clip for each receptacle adapted to fit in slots in the members; and means cooperating with the clips for forcing said unit against said flanges in order to provide substantially air-tight joints.

11. An air and gas filter comprising a stationary framework composed of members forming the sides of receptacles, each receptacle being open at both ends for the passage of air; flanges on said sides; a bent portion forming an interlocking portion on the edges of certain members, said bent portions being adapted to interlock with the edges of adjoining members in order to secure the framework together; a filter unit adapted to be inserted into a receptacle and against said flanges, the width and height of the filter unit being equal, except for a slight clearance, to the width and height of the receptacle; a clip for each receptacle adapted to fit in slots in the members; and a pin screw threaded in each clip for forcing said unit against said flanges in order to provide substantially air-tight joints.

12. An air and gas filter comprising a stationary frame-work composed of members forming the sides of receptacles, each receptacle having four sides and being open at both ends for the passage of air; flanges on said sides; a bent portion forming an interlocking portion on the edges of two sides of the frame, said bent portions being adapted to interlock with the other two edges of adjoining members in order to secure the framework together; a filter unit adapted to be inserted into a receptacle and against said flanges, the width and height of the filter unit being equal, except for a slight clearance, to the width and height of the receptacle and the unit being adapted to be forced against said flanges in order to provide substantially air-tight joints; and clips and pin screws for forcing said unit against said flanges.

In testimony whereof I affix my signature.

ANDERS JORDAHL.